United States Patent [19]
Jaeger et al.

[11] 3,722,821
[45] Mar. 27, 1973

[54] DEVICES FOR PROCESSING MOLTEN METALS

[75] Inventors: Raymond E. Jaeger, Basking Ridge; Robert Ernest Nickell, Madison, both of N.J.

[73] Assignee: Bell Telephone Laboratories, Incorporated, Murray Hill, N.J.

[22] Filed: June 3, 1971

[21] Appl. No.: 149,657

Related U.S. Application Data

[63] Continuation-in-part of Ser. No. 78,822, Oct. 7, 1970, abandoned.

[52] U.S. Cl. ............... 239/133, 164/281, 106/58, 239/591, 266/38
[51] Int. Cl. .................................................. B67d 3/02
[58] Field of Search ............. 239/133, 134, 591, 602; 164/281; 266/38; 106/57, 58

[56] References Cited

UNITED STATES PATENTS

| 3,435,992 | 4/1969 | Tisdale et al. | 164/281 X |
| 3,533,815 | 10/1970 | Baldwin | 106/57 |
| 3,044,499 | 7/1962 | Frerich | 138/143 |
| 3,392,888 | 7/1968 | Cahoon, Jr. et al. | 222/566 |
| 3,514,519 | 5/1970 | Schempp et al. | 164/281 X |
| 3,518,100 | 6/1970 | Whittemore | 106/57 |

*Primary Examiner*—M. Henson Wood, Jr.
*Assistant Examiner*—Michael Mar
*Attorney*—R. J. Guenther and Edwin B. Cave

[57] ABSTRACT

A nozzle is described for use with molten metals at elevated temperatures. The nozzle consists of a ceramic cylinder surrounded by a resistance heater used to preheat the ceramic part before exposure to the molten metal. Thermal stresses in the ceramic are reduced in two ways. The composition of the ceramic is adjusted so as to minimize thermal expansion and variations in thermal expansion with temperature. Also, high thermal conductivity sleeves are fitted on the ceramic cylinder to reduce temperature variations in the ceramic. These nozzles have considerably longer life than conventional nozzles made from graphite. Other apparatus in common with the nozzle depend for their utility on the ceramic composition; namely, the concentration of magnesia in the stabilized zirconium oxide ceramic.

8 Claims, 7 Drawing Figures

INVENTORS: R.E. JAEGER
R.E. NICKELL
BY
George S. Sadig
ATTORNEY

DEVICES FOR PROCESSING MOLTEN METALS

CROSS REFERENCE TO RELATED APPLICATION

This application is a continuation-in-part of a copending application, Ser. No 78,822 filed Oct. 7, 1970, now abandoned.

BACKGROUND OF THE INVENTION

1. Field of the Invention

The invention involves a nozzle for use with molten metals at elevated temperatures.

2. Description of the Prior Art

In many processes involving molten metallic substances provision must be made to convey the melt from one container to another. In many cases the rate at which the melt is conveyed from one container to another must be controlled. Often a nozzle is used to provide this controlled flow of molten metal. A common nozzle material is graphite. These nozzles have satisfactory thermal shock resistance and thermal conductivity so that the nozzles do not crack when exposed to large temperature variations and molten metal can be prevented from solidifying inside the nozzle with comparative ease.

However, nozzles made from graphite suffer from two distinct disadvantages. First, at elevated temperatures the part of the graphite nozzle exposed to air is oxidized. Second, the part of the nozzle exposed to the molten metal erodes which produces graphite inclusions in the finished metal product and changes the inside diameter of the graphite nozzle. This change in the inside diameter of the graphite nozzle changes the control characteristics of the nozzle with time and eventually limits the useful life of the nozzle.

An example of where nozzles are used to control the flow of molten metal is in continuous casting processes. Continuous casting has been used extensively in the processing of aluminum and to a lesser extent in the processing of copper, steel and steel alloys. The main advantage of the continuous casting process is the reduced cost of converting molten metal into a finished product (see Chemical and Engineering News, Aug. 24, 1970, page 32, for a more detailed outline of the economic advantages of using a continuous casting process in the production of steel).

In order to illustrate the use of nozzles in continuous casting processes, the process for copper is described below. This process has been described in detail by J. I. Cole and H. S. Moss in an article written by them entitled "Continuous Casting and Rolling of Copper Rod," published in The Western Electric Engineer, Volume 11, No. 3, page 2 (July, 1967). Only the pertinent parts of the process will be summarized here. This process converts either virgin or scrap copper into copper wire. The molten copper is contained in a reverberatory furnace where it has been refined into a condition suitable for conversion into copper wire. The molten copper is removed from the reverberatory furnace by chipping out a portion of the clay bay or dam in the furnace tapout and allowing the molten copper to flow along a trough into an induction heated holding furnace. The holding furnace has a twofold purpose. It serves as a reservoir to control the pouring temperature of the molten copper and as an intermediate means of regulating the flow of molten copper between the reverberatory furnace and the tundish. The tundish provides a source from which the copper flow into the mold can be finally controlled.

Of particular importance in the continuous casting process is the control of flow of molten copper into the continuous casting wheel. Copper flow is controlled at three points. As already mentioned, it is initially controlled by chipping away the dam on the reverberatory furnace. It is further controlled in the induction furnace. This is done by tilting the induction furnace to control the flow into the tundish. The copper level in the tundish is maintained at a set level.

The final control of copper flow into the mold is at the discharge of the tundish. The maintenance of a constant flow into the mold is most critical for any upset in the flow pattern markedly affects rod quality. A nozzle at the discharge of the tundish directs the flow into the mold. In spite of the fact that the heat of copper in the tundish is held constant, the flow to the mold varies due to changes in copper viscosity and nozzle erosion. The nozzle provides a means of adjusting or controlling the flow of copper either manually or automatically.

At present, nozzles used in this continuous casting operation are made of graphite. The lifetime of these nozzles is limited to about three hours and nozzle replacement necessitates stopping and restarting the continuous casting operation. Thus the limited lifetime of the nozzle reduces the maximum obtainable production by about one-third.

The limitations of existing devices used in contact with molten metals has been illustrated in terms of nozzles for use in controlling the flow of molten metals in certain processes. However, these limitations apply equally well to other devices in contact with molten metals at elevated temperatures.

SUMMARY OF THE INVENTION

The invention is apparatus for use in the processing of molten metals at elevated temperatures which is made of magnesia-stabilized zirconium oxide. Nozzles constitute a preferred embodiment for use in processing molten metals. In this case, a magnesia concentration from 2.8 to 3.1 is preferred since it reduces thermal expansion at elevated temperatures and thereby reduces thermal stress. An optimum composition under most conditions is about 3.1 percent by weight magnesia. Other apparatus, such as, for example, crucibles for containing molten metal, troughs and tubes for conveying molten metal and tubes for protecting thermocouples inserted into molten metal have a preferred composition of about 3.1 which, in accordance with the invention, has a minimum coefficient of thermal expansion at elevated temperatures.

A specific embodiment of the invention is a type of nozzle made from a magnesia-stabilized zirconium oxide in which a heater is used to preheat the nozzle before exposure to the molten metallic substance. The heater both prevents the molten metallic substance from solidifying inside the nozzle and reduces the transient temperature variation so as to reduce the thermal stress. High thermal conductivity material such as a metal sleeve or metallized ceramic is used on each end of the nozzle to increase preheating flux and to further reduce the temperature variation along the nozzle and thereby reduce the thermal stress.

DETAILED DESCRIPTION

1. The Material Composition

The invention involves both the composition of the ceramic material used in the inner liner of the nozzle and the design of the nozzle.

The inner liner of the nozzle is made from a zirconium oxide ceramic in which a small amount of magnesium oxide has been added for stabilization. This ceramic material is particularly suitable because of its resistance to oxidation and stability in contact with most molten metallic substances. Particular problems arise because of its susceptibility to thermal stress. Many of the compositional variations and design features of the nozzle are directed towards reducing the thermal stresses in the nozzle.

The resistance to thermal shock is defined as the ability of solid materials to withstand failure due to sudden heating or cooling. A quantitative measure of this resistance is the thermal shock figure of merit, a parameter which takes into account the tensile failure strength $\sigma_f$ of the material, the coefficient of thermal conductivity $k$, the elastic modulus $E$ and the coefficient of thermal expansion $\alpha$. An often used figure of merit to measure resistance to thermal shock is $$R_{fm} = k\sigma_f(1 - \nu)/\alpha E$$

where $\nu$ is Poisson's ratio. In order to understand the difficulties involved in using zirconium oxide in nozzles, it is interesting to compare some of the parameters involved in the above figure of merit with that of graphite. For example, the thermal conductivity of graphite is 30 Btu/hr-ft° F as compared to 1.125 Btu/hr-ft° F for zirconium oxide. Other quantities used in the above figure of merit also show that zirconium oxide is much more susceptible to thermal shock. The figure of merit for graphite is 30,000 Btu/hr-ft as compared to 2,250 Btu/hr-ft for zirconium oxide. Thus, in order to obtain the desirable features of resistance to oxidation and inertness to molten metals which are exhibited by zirconium oxide, greater attention must be paid to both the compositional features and design features of the nozzle so as to reduce the thermal stresses.

Figure 1:
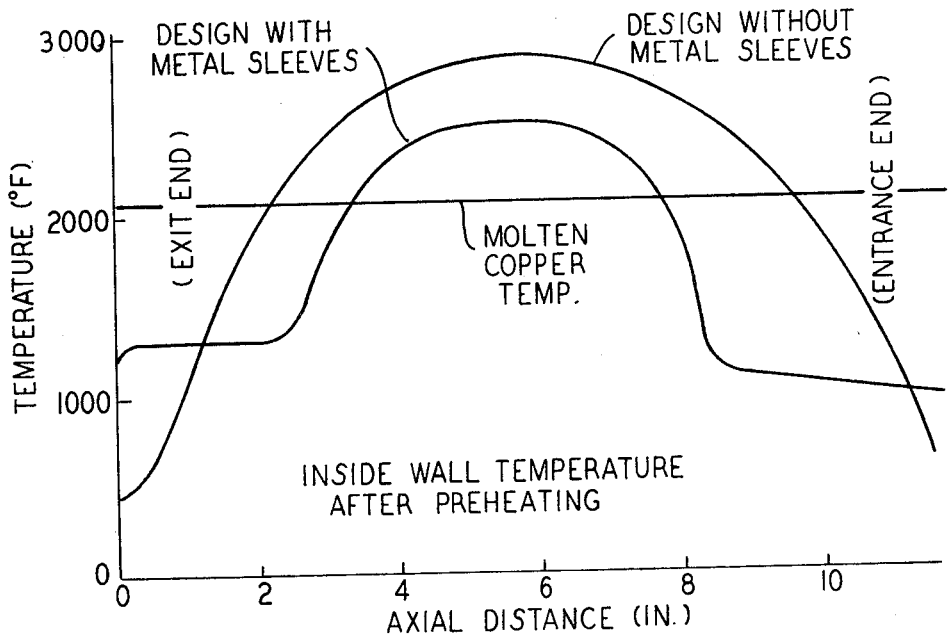
FIG. 1 is a plot on coordinates of temperature in degrees Fahrenheit against distance from the exit end of the nozzle in inches showing, for nozzle designs with and without metal sleeves on each end, the temperature distribution on the inside wall and along the axis of the nozzle.
Figure 2:
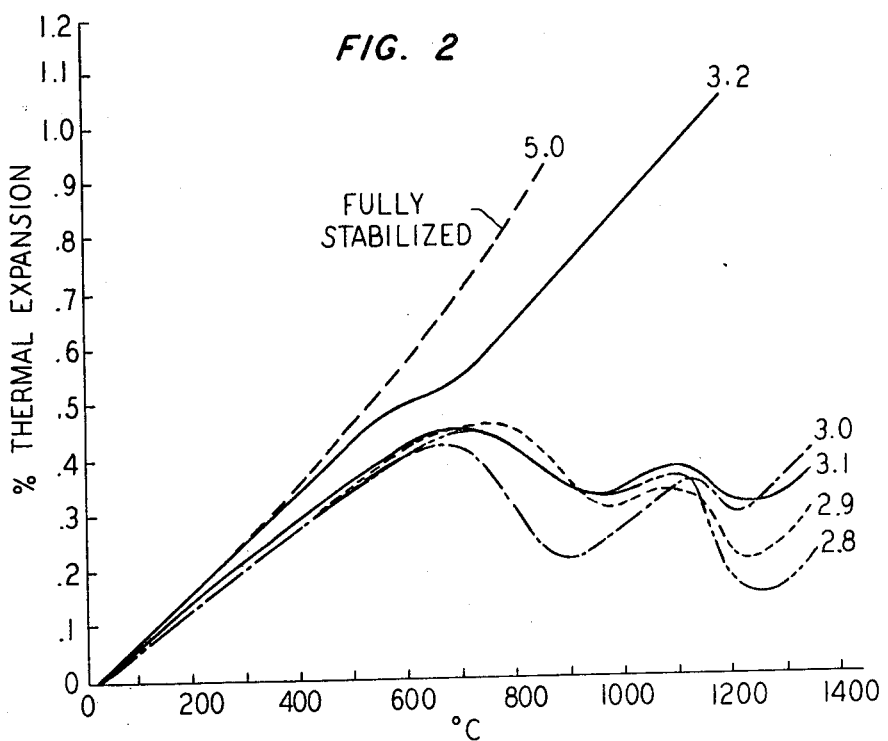
FIG. 2 is a plot on coordinates of per cent thermal expansion against temperature in degrees centigrade showing the thermal expansion characteristics of several materials containing various weight per cents of magnesium oxide in zirconium oxide.

One way of reducing thermal stresses is to minimize the thermal expansion and temperature variations in thermal expansion of the zirconium oxide in the temperature region where the nozzle operates. The temperature profile of the inside wall of the nozzle after the preheating is shown in FIG. 1. As can be seen in this figure, temperature varies from approximately 700° C at each end of the nozzle to approximately 1,300° C in the center of the nozzle. FIG. 2 shows the thermal expansion characteristics of several compositions of magnesium oxide in zirconium oxide. With fully stabilized zirconium oxide (which corresponds to about 5 weight per cent of magnesium oxide) the per cent thermal expansion is quite steep throughout the temperature range of interest. Even reduction of the weight per cent of magnesium oxide 3.2 does not significantly affect the thermal expansion. However, in a composition arranged from 2.8 to 3.1 weight per cent magnesium oxide, the per cent thermal expansion is greatly reduced between 700° and 1,300° C. This marked reduction in per cent thermal expansion and temperature variations in thermal expansion greatly reduces the thermal stress of the ceramic under operating conditions. Further careful analysis of the data presented in FIG. 2 shows that 3.1 weight per cent magnesium oxide is the preferred composition as far as minimizing the temperature variations in per cent thermal expansion in the temperature range of interest. Also, the thermal expansion characteristics of the ceramic depend critically on composition so that impurities in amounts greater than one weight per cent should be avoided. Accordingly, nozzles being a preferred embodiment are constructed of magnesia-stabilized zirconium oxide although the concentration range of 2.8 to 3.1 per cent by weight is preferred as reducing the per cent thermal expansion. Other apparatus described herein are constructed of magnesia-stabilized zirconium oxide with a concentration of about 3.1 per cent by weight of magnesia. This composition minimizes the percent thermal expansion.

2. Structural Features of the Nozzle

The thermal stress on the ceramic part of the nozzle is further reduced by incorporating certain features in the structure of the nozzle. These features involve the use of high thermal conductivity material at each end of the ceramic part of the nozzle and the use of a heater to preheat the ceramic before exposure to the molten metal.

A particular disadvantage of the use of zirconium oxide in the nozzle is its low thermal conductivity. Thus, if the zirconium oxide at room temperature is substantially exposed to molten metal at high temperatures, large temperature gradients are created in the ceramic which produce large thermal stresses.

FIG. 1 shows the temperature gradients created in the ceramic when heated by the heater to be described below. Temperatures inside the ceramic vary from about 400° F to 3,000°40 F. This temperature gradient can be substantially reduced by the use of sleeves with high thermal conductivity on each end of the ceramic portion of the nozzle. These sleeves are conveniently made of metals with sufficiently high melting points to prevent melting at these temperatures. Ion impregnated metal ceramic can also be used. As can be seen in FIG. 1, the temperature gradient throughout the ceramic portion of the nozzle is greatly reduced by incorporating the sleeves on each end of the nozzle.

A means is provided for preheating the nozzle so as to prevent the occurrence of high temperature gradients when the nozzle is exposed to the molten metal. A heater of conventional design may be used for this purpose.

Further reduction in the temperature gradient in the nozzle may be achieved by making the density of heater wire in each end of the nozzle greater than in the center of the nozzle. The heater is also used to maintain the ceramic portion of the nozzle at high temperatures so as to prevent thermal cycling of the nozzle, which for some ceramic compositions is detrimental to the structural integrity of the ceramic.

3. Drawing

FIG. 1 is a graph showing data on the temperature profile of the ceramic portion of two nozzles, one with and one without metal sleeves on each end. This data was obtained by attaching thermocouples to the inside wall of the ceramic portion of the nozzle and preheating the nozzle with the heater. The object of these measurements was to determine ways to reduce temperature gradients in the ceramic portion of the nozzle and thereby reduce thermal stresses in the ceramic. As can be seen from FIG. 1, the use of high thermal conductivity sleeves at each end of the nozzle markedly reduces the temperature gradients in the nozzle.

FIG. 2 is a graph which shows the thermal expansion characteristics of several ceramics as a function of temperature. The ceramics contain predominantly $ZrO_2$ with varying amounts of magnesium oxide. Each curve is labeled with the weight per cent of magnesium oxide in the entire composition. In the case of five weight per cent of magnesium oxide, the ceramic is fully stabilized in the sense that on cooling from the firing temperature the ceramic does not undergo any phase transitions. Where the content of magnesium oxide is from 2.8 to 3.1 weight per cent of the entire composition, the ceramic is only partially stabilized and small grains of the material possibly undergo phase transitions. For this reason the thermal expansion characteristics of the partially stabilized ceramic are affected by careful adjustment of the amount of magnesium oxide in the ceramic. The thermal expansion can be greatly reduced which in turn greatly reduces the thermal stresses in the ceramic. The reduction in thermal expansion in the temperature range to which the ceramic is exposed is greatest in the compositional range of 2.8 to 3.1 weight per cent magnesium oxide. The preferred composition is 3.1 weight per cent magnesium oxide which exhibits the minimum variation in thermal expansion.

Figure 3:
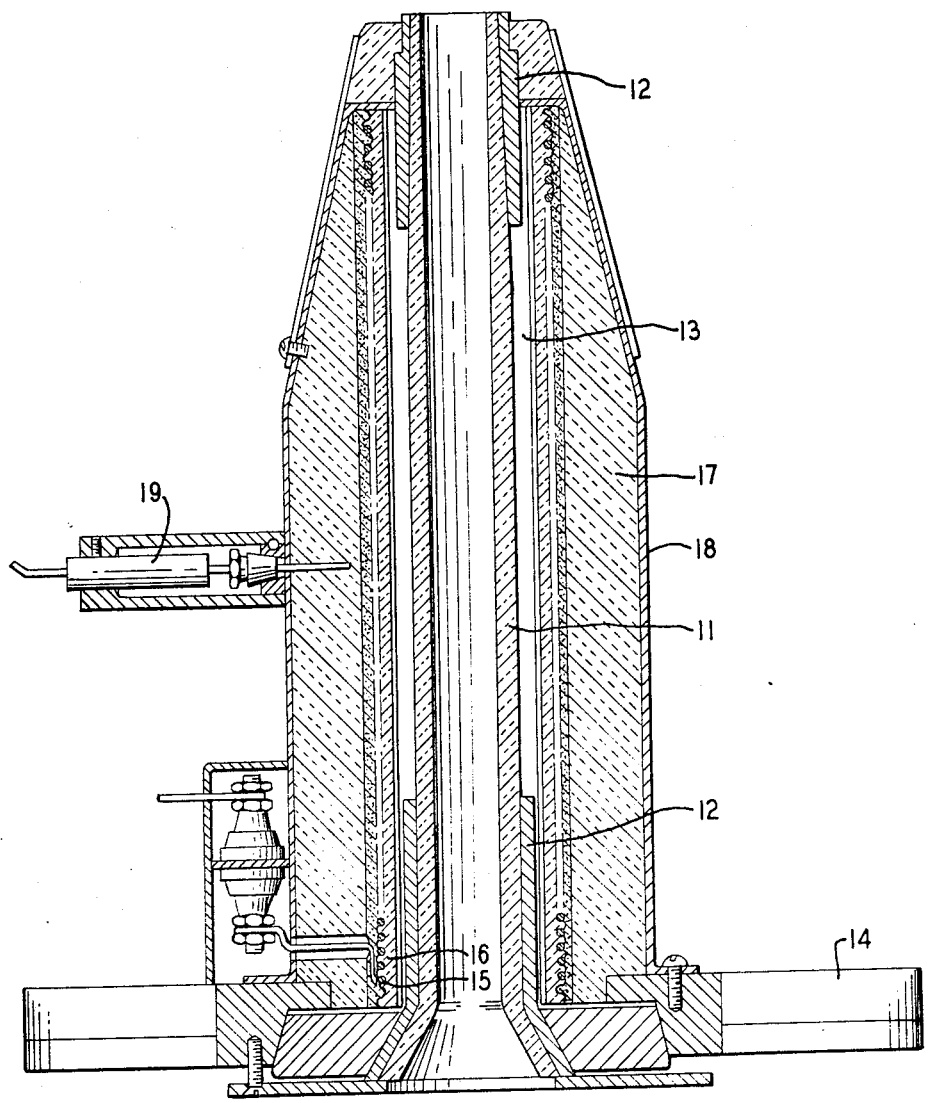
FIG. 3 is a sectional view of a nozzle made in accordance with the invention showing the ceramic cylinder made of magnesia-stabilized zirconium oxide, the metal sleeves on each end of the ceramic cylinder and the heater surrounding the ceramic cylinder.

FIG. 3 is a sectional view of a nozzle of appropriate design. The ceramic portion of the nozzle is shown on the inside 11 with the high thermal conductivity shields 12 on each end with an air space 13 between ceramic and heater. The nozzle is equipped with heater wire 15 wound around ceramic material 16 in the nozzle. The outer portion of the nozzle is equipped with thermal insulating material 17. The outside of the nozzle is equipped with a stainless steel liner 18 and a thermocouple 19 is mounted on the outside of the nozzle for temperature controlling purposes.

Figure 4:
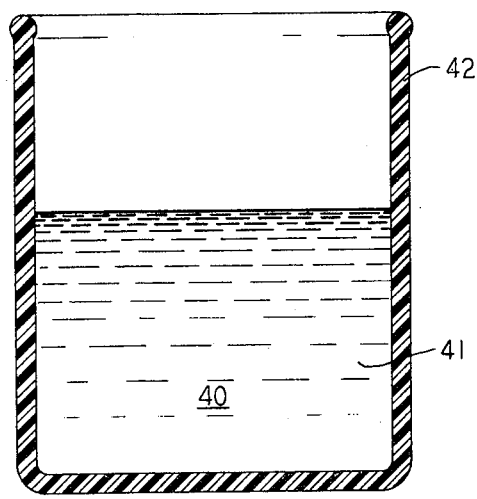
FIG. 4 is a perspective view of a crucible made of magnesia-stabilized zirconium oxide which contains molten metal.

FIG. 4 is a perspective view of a crucible 40 containing molten metal 41 and made of magnesia-stabilized zirconium oxide 42.

Figure 5:
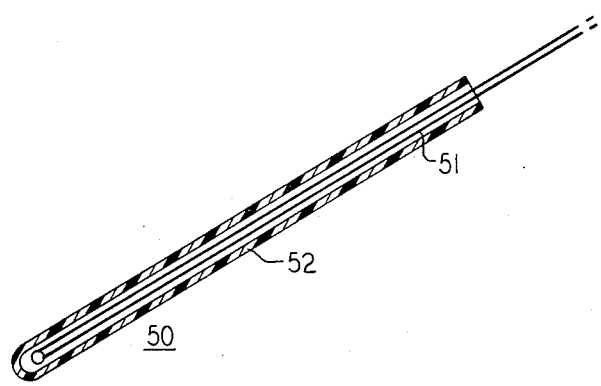
FIG. 5 is a side view of a ceramic tube made of magnesia-stabilized zirconium oxide which is used to protect a thermocouple.

FIG. 5 is a side view of a thermocouple tube 50 containing thermocouple wires 51 and made of magnesia-stabilized zirconium oxide 52.

Figure 6:
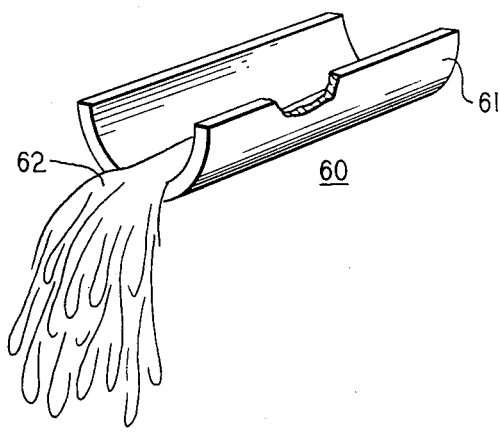
FIG. 6 is a perspective view of a trough for conveying molten metal.

FIG. 6 is a perspective view of a trough 60 made from magnesia-stabilized zirconium oxide 61 containing molten metal 62.

Figure 7:
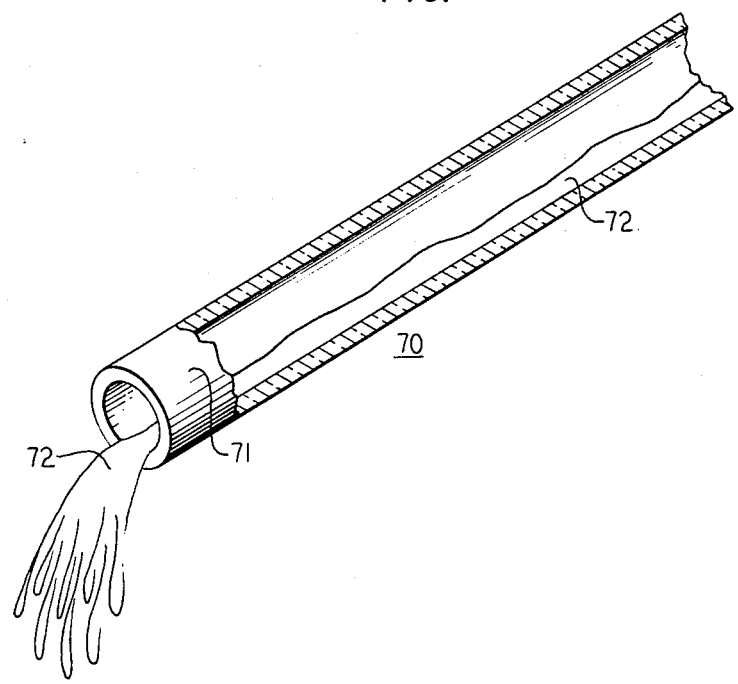
FIG. 7 is a side view of a hollow tube for conveying molten metal.

FIG. 7 is a side view of a tube 70 made from magnesia-stabilized zirconium oxide 71 containing molten metal 72.

What is claimed is:

1. An apparatus for the continuous casting of metallic substances which includes a nozzle characterized in that the part of the nozzle in contact with the molten metallic substance consists essentially of magnesia-stabilized zirconium oxide ceramic together with means to preheat the nozzle before exposure to the molten metal in which 99 weight per cent of the ceramic contains from 2.8 to 3.1 weight per cent magnesia based on the entire composition, remainder zirconium oxide and in which the said nozzle is designed for use in the temperature range from 700° C to 1300° C.

2. The nozzle of claim 1 together with additional means for reducing the spatial temperature variation in the ceramic.

3. The nozzle of claim 2 in which the said additional means comprises contacting material of thermal conductivity higher than the ceramic.

4. The nozzle of claim 1 in which the said means of preheating the nozzle consists essentially of at least one electric heater.

5. The nozzle of claim 1 where the weight per cent magnesia is about 3.1.

6. The nozzle of claim 1 where the metallic substance consists essentially of copper.

7. An apparatus for use in the processing of molten metals at elevated temperatures made of a ceramic material in which the apparatus is in contact with the molten metal, characterized in that the said ceramic material is magnesia-stabilized zirconium oxide in which the concentration of magnesia is approximately 3.1 weight per cent and in which the said apparatus is designed for use in the temperature range from 700° C to 1300° C.

8. The apparatus of claim 7 in which the concentration of magnesia is from 3.05 to 3.15 weight per cent.

* * * * *